April 16, 1957 H. M. UTHENE 2,789,216
SWITCHING CIRCUIT
Filed Dec. 7, 1951 2 Sheets-Sheet 1
FIG. 1
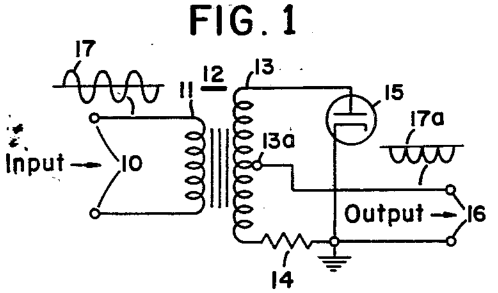
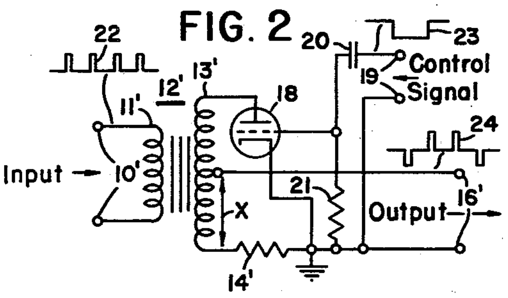
FIG. 1A
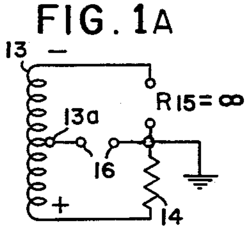
FIG. 1B
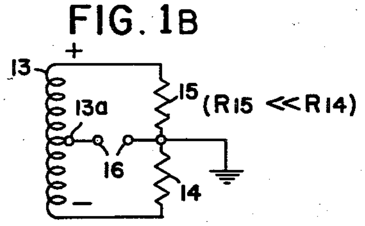
FIG. 4
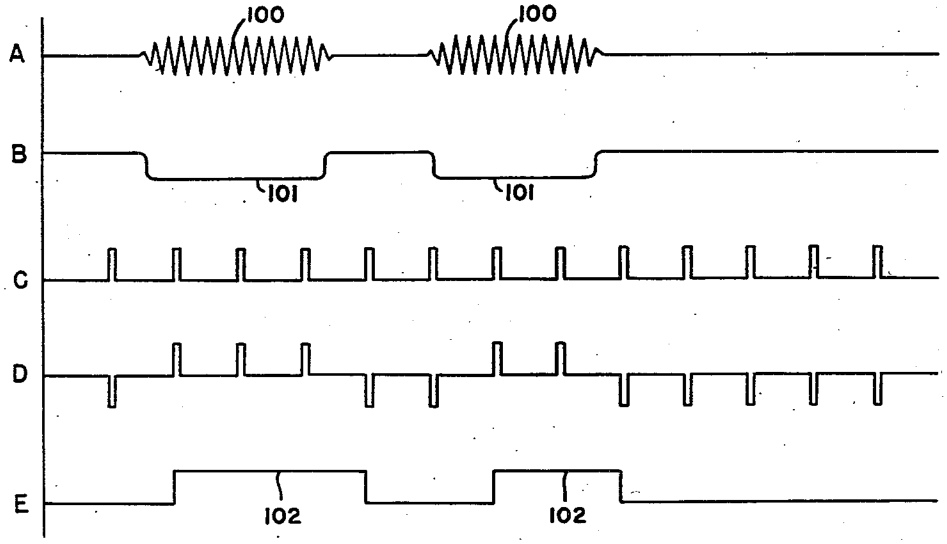
INVENTOR:
HOWARD M. UTHENE
BY Francis W. Crotty
HIS ATTORNEY.

April 16, 1957 H. M. UTHENE 2,789,216

SWITCHING CIRCUIT

Filed Dec. 7, 1951 2 Sheets-Sheet 2

INVENTOR:
HOWARD M. UTHENE
BY Francis W. Crotty
HIS ATTORNEY.

United States Patent Office 2,789,216

Patented Apr. 16, 1957

2,789,216

SWITCHING CIRCUIT

Howard M. Uthene, Chicago, Ill., assignor to Zenith Radio Corporation, a corporation of Illinois Application December 7, 1951, Serial No. 260,386

3 Claims. (Cl. 250—27)

Figure 3:
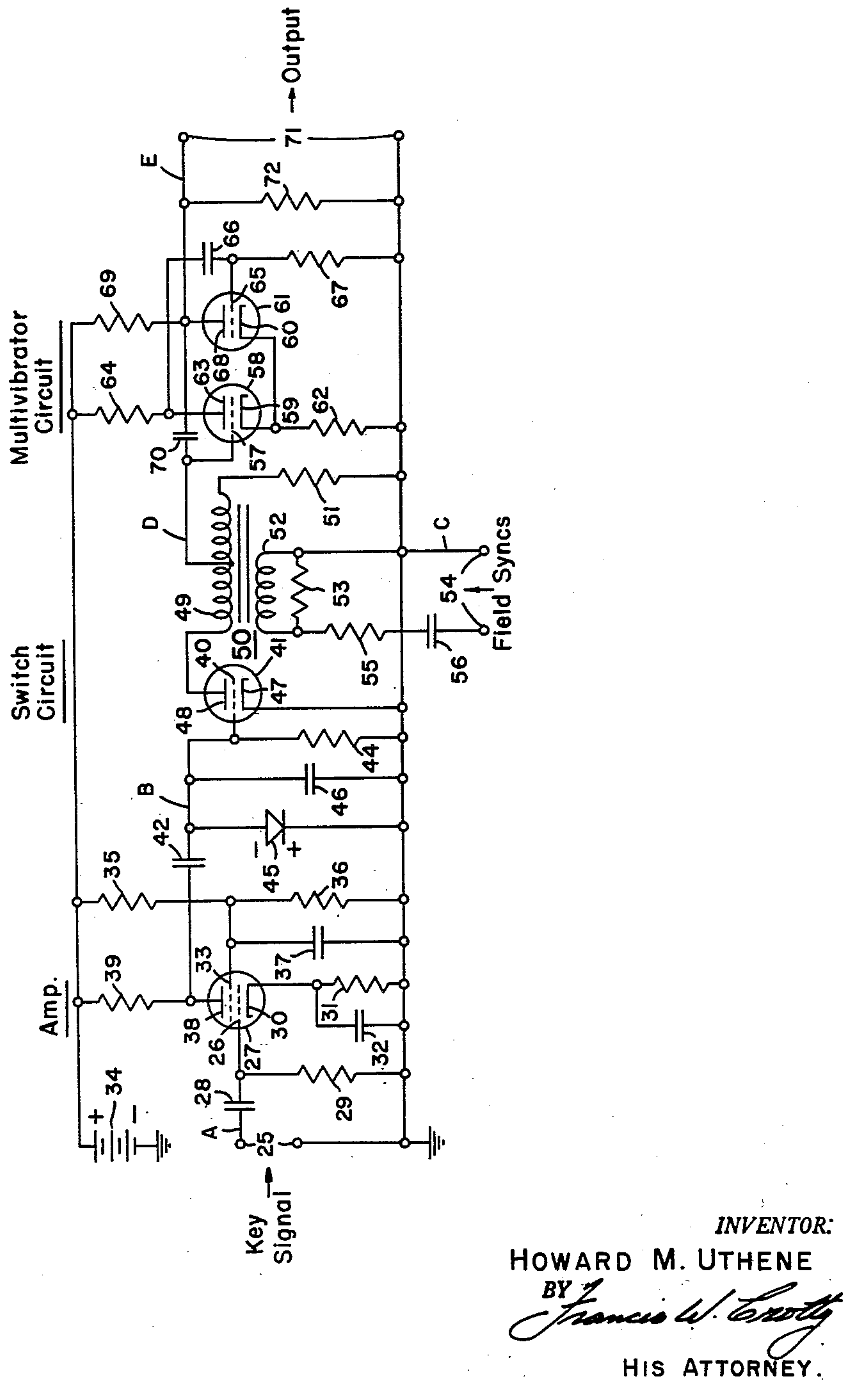

This invention relates generally to switching circuits; and more particularly to an improved switching circuit which includes an impedance whose terminals are alternately established at a reference potential by the switching action of the circuit. The switching action may be under the control of an applied signal having some characteristic, such as polarity, that is to be altered from time to time in the course of its translation by the switching circuit; or it may be under the control of a second or actuating signal which is impressed on the circuit to determine the characteristic variations imposed on the first-mentioned signal.

In one embodiment the improved circuit may function to invert the polarity of selected pulses from a series of pulses as determined by a control or actuating signal impressed on the circuit. This application is extremely useful in subscriber television systems of the type disclosed in Roschke Patent No. 2,547,598, which issued April 3, 1951, entitled "Subscription, Image Transmission System and Apparatus" and assigned to the present assignee; and in copending application Serial No. 79,432, filed March 3, 1949, in the name of Albert Cotsworth III et al., now U. S. Patent No. 2,632,799, issued March 24, 1953, and assigned to the present assignee.

It is, accordingly, an object of this invention to provide a new and improved switching circuit that involves a minimum of components and which may be constructed in a simple and expeditious manner.

The switching circuit of the present invention comprises a center-tapped input impedance with an electron-discharge device, including a control electrode, and a bi-directional impedance connected in series across the input impedance; the value of the bi-directional impedance is larger than the conductive internal impedance and smaller than the non-conductive internal impedance of the discharge device. A network is provided for impressing a signal on the control electrode to control the conductivity of the discharge of the discharge device, and a pair of output terminals are connected to the center tap of the input impedance and to the junction of the bi-directional impedance and the discharge device.

The features of the present invention which are believed to be novel are set forth with particularity in the appended claims. The invention itself, both as to its organization and manner of operation, together with further objects and advantages thereof may best be understood by reference to the following description taken in connection with the accompanying drawings in which:

Figure 1 is a diagram of a circuit useful in explaining the operation of the switching circuit of this invention, Figure 2 is a diagram of an embodiment of the present invention, Figures 1*a* and 1*b* are diagrams useful in explaining the operation of the circuits of Figures 1 and 2, Figure 3 shows the invention incorporated in a control circuit for a subscription television system, and Figure 4 comprises various curves useful in explaining the operation of the circuit of Figure 3.

The circuit of Figure 1 includes a pair of input terminals 10 connected to the primary winding 11 of a transformer 12 which constitutes an input impedance for the circuit. The secondary winding 13 of the transformer has one terminal connected to a point of reference potential, such as ground, through a bi-directional impedance element shown as a resistor 14. The other terminal of the secondary winding is connected to the point of reference potential through a uni-directional impedance which in this instance comprises a diode or similar uni-directional conductive device 15. Resistor 14 is chosen to have an impedance which is larger than the internal resistance of device 15. The circuit further includes a pair of output terminals 16 connected to the point of reference potential and to a tap 13*a*, preferably the center tap of winding 13.

The operation of the circuit of Figure 1 may best be understood by reference to the diagrams of Figures 1*a* and 1*b* which constitute equivalent circuits thereof. Assuming that a sine-wave 17 is impressed upon input terminals 10 of the primary winding 11 of the transformer, it is transformed and appears across secondary winding 13. During one series of half-cycles of the signal appearing across the secondary, the upper terminal of the secondary is negative with respect to its lower terminal, and device 15 is non-conductive. This condition is shown in Figure 1*a* wherein the effective impedance $R_{15}$ of the device is infinite for all practical purposes. Assuming for purposes of explanation that the load impedance across output terminals 16 is extremely high; then throughout such negative half cycles the lower end of winding 13 is essentially at ground potential since there is negligible potential drop across resistor 14. The potential of tap 13*a* which is negative with respect to the lower end is negative therefore with respect to ground for this condition and, hence, the potential across terminals 16 is likewise negative.

On the other hand, during the alternate series of positive half-cycles of the signal appearing across the secondary, the upper end of the secondary is positive with respect to the lower end. In this condition, as shown in Figure 1*b*, diode 15 becomes conductive and $R_{15}$ is now much less than $R_{14}$ the resistance of resistor 14. It is apparent from an examination of Figures 1*a* and 1*b* that the circuit constitues a bridge network with output terminals 16 coupled to opposite diagonals. Accordingly, since the diode impedance during its conductive cycles is small relative to the impedance of resistor 14 the potential of the upper end of winding 13 is now established essentially at ground potential and tap 13*a* and the lower end of the winding at a substantial negative potential with respect to ground. Therefore, the potential across terminals 16 is again negative so that the signal appearing across these terminals is uni-directional for both conditions, and has a wave-form shown in curve 17*a*, representing full-wave rectification of the signal applied to input terminals 10.

During the negative half-cycles of the driving signal obtained at the secondary winding of the transformer, the amplitude of the output signal across terminals 16 is in part dependent upon the load impedance and upon the value of resistor 14, that is if the load impedance is not infinite. This obtains since current flow in the load impedance produces a current flow through resistor 14 and a resulting potential drop across this resistor altering the potential of tap 13*a*. Likewise, during the positive half-cycles of the driving signal, the amplitude of the signal across terminals 16 is in part dependent upon the value of resistor 14. It is preferable for many applications that the output signal obtained across terminals 16 have equal amplitude during both half cycles of the driving signals and, to achieve that result, resistor 14 is given a selected value for a selected load. For example, when diode 15 is of the type designated commercially as "1N34", resistor 14 should preferably have a value of 15,000 to 20,000 ohms for a load impedance greater than 400,000 ohms. With such parameters, the output potential is substantially equal for all half cycles of the driving signal. For load impedances less than 15,000 ohms, it has been found that the value of resistor 14 ($R_x$) should be increased proportionately to the decrease in load impedance ($Z_x$) in accordance with the following equation:

$$\frac{R_x}{400{,}000}=\sqrt{\frac{20{,}000}{Z_x}}$$

It can be seen, therefore, that the alternating-current signal impressed on input terminals 10 undergoes full-wave rectification in the circuit of Figure 1, and this is achieved by means of but a single diode. The output signal appearing across terminals 16 may be filtered in any suitable filter network to provide a non-fluctuating uni-directional potential, or it may be applied to a transformer or equivalent element to produce a sine wave having double the frequency of the signal applied to terminals 10.

The arrangement of Figure 2 is similar to that of Figure 1, except that the diode 15 of Figure 1 has been replaced by a triode 18. The input circuit of the triode provides an actuation control and includes a pair of input terminals 19 connected to the point of reference potential and to the control electrode of triode 18 through a coupling capacitor 20, the control electrode being connected to the point of reference potential through a grid-leak resistor 21. The other elements of this embodiment of the invention are similar to those of Figure 1 and have been designated by like numerals primed.

It will be assumed that a signal 22, comprising a succession of positive pulse components, is impressed across terminals 10' of primary winding 11'. It will be further assumed that the polarity of the transformer windings is selected to effect no phase reversal of the driving pulses as they appear across the secondary. Consequently, when triode 18 is non-conductive, output pulses of positive polarity are delivered to output terminals 16'. However, when tube 18 is conductive, the pulses supplied to output terminals 16' are inverted or are of negative polarity as will be apparent from a consideration of the bridge-network theory outlined in conjunction with the circuit of Figure 1. The conductivity of tube 18 is controlled by a control signal 23 impressed across terminals 19 and having negative pulse components which drive the triode from a conductive state. The duration of the negative-polarity control pulses may be of the same order of magnitude as or may be much longer than, the pulses 22. Therefore, the output signal 24 produced across output terminals 16' has negative-polarity pulses during operating intervals when device 18 is conductive, but has positive-polarity pulses during other intervals determined by the negative pulse components of control signal 23.

The circuit of Figure 2 is particularly suited for use in subscription television systems for actuating coding and decoding apparatus therein. The subscription transmitter disclosed in the afore-mentioned Roschke patent develops and distributes to subscriber receivers a key signal consisting of a series of bursts of signal energy indicating the coding schedule of the television signal. This key signal is utilized at the receivers to actuate decoding apparatus at proper times to effect decoding of the received subscription signal. To prevent distortion, the Roschke system provides that the actuation of the coding apparatus at the transmitter and the decoding apparatus at the various receivers takes place during field-retrace intervals following the initiation and termination of each burst of the key signal. This is accomplished by a control circuit which responds to the joint application of the key-signal bursts and field-synchronizing pulses to actuate the coding and decoding apparatus. The switching circuit of this invention may serve as a component of this type of control network, and such a network incorporating the invention is illustrated in Figure 3.

The control network of Figure 3 includes a pair of input terminals 25, one of which is grounded and the other coupled to the control electrode 26 of an electron-discharge device 27 through a coupling capacitor 28, the control electrode being connected to ground through a grid-leak resistor 29. The cathode 30 of device 27 is connected to ground through a resistor 31 which is by-passed by a capacitor 32. The screen electrode 33 is connected to the positive terminal of a source of unidirectional potential 34 through a resistor 35 and is connected to ground through a resistor 36 by-passed by a capacitor 37. The anode 38 is connected to the positive terminal of source 34 through a load resistor 39 and is further coupled to the control electrode 40 of an electron-discharge device 41 through a coupling capacitor 42, control electrode 40 being connected to ground through a grid-leak resistor 44. The junction of capacitor 42 and control electrode 40 is connected to ground through a rectifier 45 shunted by a capacitor 46.

The portion of the network including discharge device 41 is similar to that of Figure 2, the cathode 47 of this device being connected to ground and the anode 48 being connected to ground through the secondary winding 49 of the transformer 50 and through a series-connected resistor 51. The primary winding 52 of transformer 50 is shunted by a resistor 53, one terminal of the primary being grounded and the other connected to the ungrounded one of a pair of input terminals 54 through a resistor 55 and a series-connected capacitor 56.

The center tap of secondary winding 49 is connected to the control electrode 57 of an electron-discharge device 58. The cathode 59 of device 58 is directly connected to the cathode 60 of an electron-discharge device 61, the cathodes being connected to ground through a resistor 62. The anode 63 of device 58 is connected to the positive terminal of source 34 through a resistor 64 and is coupled to the control electrode 65 of device 61 through a capacitor 66, this control electrode being connected to ground through a resistor 67. The anode 68 of device 61 is connected to the positive terminal of source 34 through a resistor 69 and is coupled to control electrode 57 of device 58 through a capacitor 70. The control circuit includes a pair of output terminals 71 connected to ground and to anode 68 of device 61, these terminals being shunted by a resistor 72.

The operation of the circuit of Figure 3 may best be understood by reference to the curves of Figure 4. The bursts of key signal 100, shown in curve A, are impressed across input terminals 25 and amplified by device 27. The amplified key signal is rectified in rectifier 45 to produce a signal, shown in curve B, having negative pulse components 101 corresponding in time to the afore-mentioned key-signal bursts 100. During the intervals between the negative-polarity pulses 101, device 41 is conductive and positive field-synchronizing pulses, shown in curve C, impressed across input terminals 54 are applied to control electrode 57 with inverted or negative polarity in the manner of the circuit of Figure 2. However, for the duration of each of the negative-polarity pulses 101, device 41 is rendered non-conductive and the positive field-synchronizing pulses are translated and impressed on control electrode 57 with positive polarity, that is, with no change of polarity. The pulses impressed on control electrode 57 are shown in curve D; they are of negative polarity during the intervals between the negative-polarity control pulses 101 and are of positive polarity within the duration of each control pulse.

Devices 58 and 61 are connected to form a well-known multivibrator circuit of the single-shot type having two operating conditions. Each positive pulse impressed on control electrode 57 triggers the multivibrator from the first to its second condition wherein it remains until the next succeeding negative pulse returns it to the first condition. The multivibrator supplies a signal to output terminals 71 having positive pulse components 102 occurring whenever the multivibrator is in its second operating condition. Examination of curves A and E of Figure 4 reveals that the positive pulse components 102 of curve E occur during intervals determined by the bursts of key signal 100 of curve A, but are initiated and terminated during field-retrace intervals corresponding to the first field-synchronizing pulses following the beginning and ending of each such burst. The output signal from terminals 71 may be used to control coding or decoding apparatus in the subscription television system, and actuates such apparatus during the field-retrace intervals following the beginning and ending of each key-signal burst.

The invention provides, therefore, an improved switching circuit that is inherently simple to construct and which finds great utility in the art. The circuit uses a minimum of components and yet achieves results that previously necessitated relatively complicated and costly apparatus.

While particular embodiments of the invention have been shown and described, it will be obvious to those skilled in the art that changes and modifications may be made without departing from this invention in its broader aspects, and, therefore, the aim in the appended claims is to cover all such changes and modifications as fall within the true spirit and scope of this invention.

I claim:

1. A switching circuit consisting essentially of: a transformer having a primary and a center-tapped secondary winding; a pair of input terminals connected to said primary winding; a resistor connected to one end of said secondary winding; an electron-discharge device including a cathode connected to said resistor, an anode connected to the other end of said secondary, and a control electrode, the resistance of said resistor being larger than the conductive internal resistance of said discharge device and smaller than the non-conductive internal impedance of said discharge device; a network for impressing a signal on said control electrode to control the conductivity of said discharge device; and a pair of output terminals connected to the center-tap of said secondary winding and to the junction of said resistor and said cathode.

2. A switching circuit consisting essentially of: a transformer having a primary and a center-tapped secondary winding; a pair of input terminals connected to said primary winding; a resistor connected to one end of said secondary winding; an electron-discharge device including a cathode connected to said resistor and to a point of reference potential, an anode connected to the other end of said secondary, and a control electrode, the resistance of said resistor being larger than the conductive internal resistance of said discharge device and smaller than the non-conductive internal impedance of said discharge device; a network for impressing a signal on said control electrode to control the conductivity of said discharge device; and a pair of output terminals connected to the center-tap of said secondary winding and to the junction of said resistor and said cathode.

3. A switching circuit comprising: a center tapped input impedance; an electron-discharge device, including a control electrode, and a bi-directional impedance connected in series across said input impedance, the value of said bi-directional impedance being larger than the internal impedance of said discharge device when the latter is conductive and smaller than the internal impedance of said discharge device when the latter is non-conductive; a network for impressing a signal on said control electrode to control the conductivity of said discharge device; and a pair of output terminals connected to the center tap of said input impedance and to the junction of said bi-directional impedance and said discharge device.

References Cited in the file of this patent

UNITED STATES PATENTS

| | | |
|---|---|---|
| 1,704,791 | Crouse | Mar. 12, 1929 |
| 2,157,888 | Dawson | May 9, 1939 |
| 2,498,900 | Schoenfeld | Feb. 28, 1950 |
| 2,599,675 | Volz | June 10, 1952 |